United States Patent
Ma et al.

(10) Patent No.: US 11,123,968 B2
(45) Date of Patent: *Sep. 21, 2021

(54) DECORATIVE LAMINATES HAVING A TEXTURED SURFACE EXHIBITING SUPERHYDROPHOBICITY, SELF-CLEANING AND LOW ADHESION

(71) Applicant: Wilsonart LLC, Temple, TX (US)

(72) Inventors: Muyuan M. Ma, Austin, TX (US); Rajesh Ramamurthy, Temple, TX (US)

(73) Assignee: WILSONART LLC, Austin, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/593,373

(22) Filed: Jan. 9, 2015

(65) Prior Publication Data

US 2015/0191043 A1 Jul. 9, 2015

Related U.S. Application Data

(60) Provisional application No. 61/925,546, filed on Jan. 9, 2014.

(51) Int. Cl.
| | |
|---|---|
| *B32B 29/00* | (2006.01) |
| *B32B 37/18* | (2006.01) |
| *B44C 1/24* | (2006.01) |
| *B44C 5/04* | (2006.01) |
| *B32B 5/06* | (2006.01) |

(52) U.S. Cl.
CPC .............. *B32B 29/005* (2013.01); *B32B 5/06* (2013.01); *B32B 37/18* (2013.01); *B44C 1/24* (2013.01);

(Continued)

(58) Field of Classification Search
CPC ......... B32B 29/005; B32B 7/06; B32B 37/18; B32B 2250/26; B32B 2307/748; B32B 2307/73; B32B 2260/046; B32B 2260/028; B32B 2317/125; B32B 2419/00; B32B 2607/00; B32B 2451/00; B44C 5/0469; B44C 1/24; B08B 17/065; B29C 39/026;

(Continued)

(56) References Cited

U.S. PATENT DOCUMENTS

| | | | |
|---|---|---|---|
| 4,284,453 A | 8/1981 | Endrizzi | |
| 4,311,766 A * | 1/1982 | Mattor | ..................... B29C 33/62 |
| | | | 156/232 |

(Continued)

FOREIGN PATENT DOCUMENTS

| | | |
|---|---|---|
| EP | 0474470 A2 | 3/1992 |
| EP | 2527408 A1 | 11/2012 |

(Continued)

*Primary Examiner* — Nancy R Johnson
(74) *Attorney, Agent, or Firm* — Welsh Flaxman & Gitler LLC

(57) ABSTRACT

A decorative laminate lay-up used in the manufacture of decorative laminates includes a decorative laminate sheet assembly composed of resin impregnated paper layers and a textured release sheet positioned on a top surface of the decorative laminate sheet assembly. The textured release sheet provides a textured surface to decorative laminates resulting from processing of the decorative laminate sheet assembly, wherein the textured release sheet includes a textured surface exhibiting superhydrophobicity, self-cleaning and low surface energy.

4 Claims, 5 Drawing Sheets

(52) U.S. Cl.
CPC ........ *B44C 5/0469* (2013.01); *B32B 2255/12* (2013.01); *B32B 2255/26* (2013.01); *B32B 2260/028* (2013.01); *B32B 2260/046* (2013.01); *B32B 2307/73* (2013.01); *B32B 2317/125* (2013.01); *B32B 2419/00* (2013.01); *B32B 2607/00* (2013.01); *Y10T 156/1041* (2015.01); *Y10T 428/24355* (2015.01)

(58) Field of Classification Search
CPC ... B29C 39/148; B29C 43/021; B29C 43/022; B29C 2043/3634; B29C 59/02; B29C 59/022; B29C 59/023
See application file for complete search history.

(56) References Cited

U.S. PATENT DOCUMENTS

| | | | |
|---|---|---|---|
| 4,327,121 A * | 4/1982 | Gray, III | D21H 27/001 156/247 |
| 6,423,167 B1 | 7/2002 | Palmer et al. | |
| 9,809,013 B2 | 11/2017 | Haller et al. | |
| 2001/0046590 A1 | 11/2001 | Benton et al. | |
| 2003/0003257 A1 | 1/2003 | Kendall et al. | |
| 2004/0089409 A1 | 5/2004 | Kendall et al. | |
| 2011/0024938 A1 | 2/2011 | Tripp et al. | |
| 2011/0042000 A1 | 2/2011 | Wilde et al. | |
| 2013/0115420 A1* | 5/2013 | Park | B32B 3/30 428/141 |
| 2015/0290910 A1 | 10/2015 | Haller et al. | |

FOREIGN PATENT DOCUMENTS

| | | |
|---|---|---|
| JP | S63307945 A | 12/1988 |
| JP | 2017128634 A | 7/2017 |
| WO | 2012122206 A1 | 9/2012 |
| WO | 2013133862 A1 | 9/2013 |
| WO | 2013154695 A1 | 10/2013 |
| WO | 2014075804 A1 | 5/2014 |

* cited by examiner

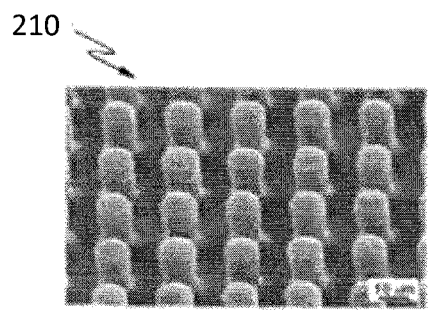
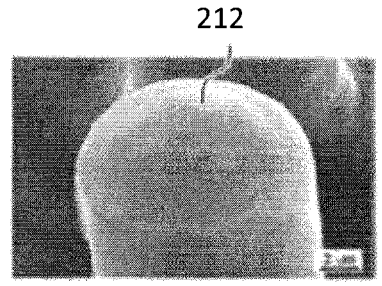
FIG. 5A
PRIOR ART
FIG. 5B
PRIOR ART

201
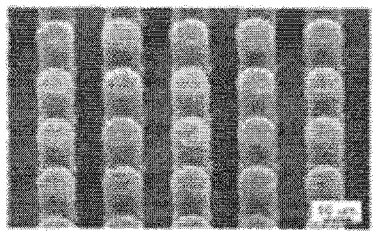 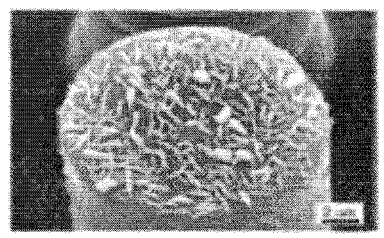
FIG. 6A
PRIOR ART
FIG. 6B
PRIOR ART
201
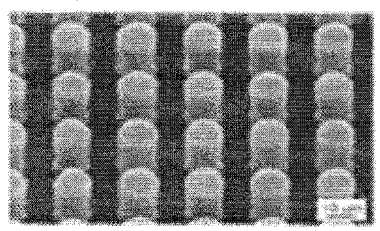 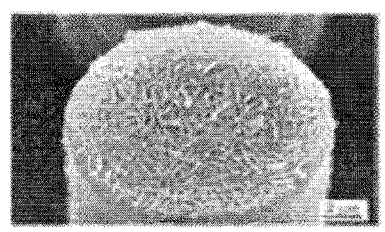
FIG. 7A
PRIOR ART
FIG. 7B
PRIOR ART
201
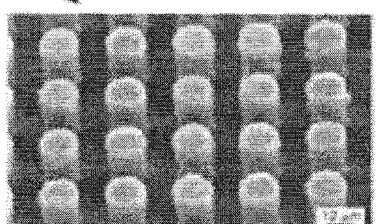 
FIG. 8A
PRIOR ART
FIG. 8B
PRIOR ART

DECORATIVE LAMINATES HAVING A TEXTURED SURFACE EXHIBITING SUPERHYDROPHOBICITY, SELF-CLEANING AND LOW ADHESION

CROSS REFERENCE TO RELATE APPLICATION

This application claims the benefit of U.S. Provisional Patent Application Ser. No. 61/925,546, entitled "DECORATIVE LAMINATES HAVING A TEXTURED SURFACE EXHIBITING SUPERHYDROPHOBICITY, SELF-CLEANING AND LOW ADHESION," filed Jan. 9, 2014.

BACKGROUND OF THE INVENTION

1. Field of the Invention

The invention relates to decorative laminates. More particularly, the invention relates to decorative laminates having a textured surface exhibiting superhydrophobicity, self-cleaning and low adhesion, and method for manufacturing such decorative laminates.

2. Description of the Related Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as counter and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine impregnated sheet. The decorative sheet may be further covered with a melamine impregnated overlay. The core, or base, functions to impart rigidity to the decorative laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90-150 pound phenolic resin impregnated Kraft paper and a substrate. The Kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the decorative laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50-125 ream weight, pigment filled, alpha cellulose paper impregnated with a water alcohol solution of melamine formaldehyde resin. The resin impregnated decorative sheets are subsequently dried, partially cured, and finally cut into sheets. The pigment filled, alpha cellulose paper of the decorative sheet, may include a solid color, a decorative design, or a photogravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the decorative laminate stack to pressure in the range of about 800-1600 psi for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one decorative laminate is formed at one time. Multiple decorative laminates are formed by inserting a plurality of assembled sheets in a stack. Release sheets are positioned between the assembled sheets to separate the various laminates stacked together. After consolidation, the release sheets allow the individual decorative laminates to be separated.

Textured decorative laminates are also very popular. The textured surfaces range from relatively shallow depressions, such as, textured (e.g., satin, matte or semi-gloss) surfaces, to relatively deeply sculpted or embossed surfaces having a noticeable three-dimensional effect, such as, wood grain, leather, slate, abstract patterns, creative designs etc. The textured decorative laminates are commonly manufactured using release sheets with the desired surface texture, which surface texture is imparted to the decorative laminate during the application of heat and pressure in the manufacturing process.

SUMMARY OF THE INVENTION

It is, therefore, an object of the present invention to provide a decorative laminate lay-up used in the manufacture of decorative laminates. The decorative laminate lay-up includes a decorative laminate sheet assembly composed of resin impregnated paper layers. The decorative laminate lay-up also includes a textured release sheet positioned on a top surface of the decorative laminate sheet assembly. The textured release sheet provides a textured surface to decorative laminates resulting from processing of the decorative laminate sheet assembly, wherein the textured release sheet includes a textured surface exhibiting superhydrophobicity, self-cleaning and low surface energy.

It is also an object of the present invention to provide a decorative laminate lay-up wherein the textured release sheet is cast.

It is another object of the present invention to provide a decorative laminate lay-up wherein the textured release sheet is an acrylic coated paper.

It is a further object of the present invention to provide a decorative laminate lay-up wherein the textured surface of the textured release sheet includes hierarchical structures comprising microstructures and nanostructures.

It is also an object of the present invention to provide a decorative laminate lay-up wherein the microstructures are composed of a plurality of microasperities disposed in a spaced geometric pattern.

It is another object of the present invention to provide a decorative laminate lay-up wherein the nanostructures comprise a plurality of nanoasperities disposed on at least one surface of the microstructures.

It is a further object of the present invention to provide a decorative laminate lay-up wherein the decorative laminate sheet assembly includes an overlay paper layer, a decorative layer, and a core layer, and the textured release sheet is positioned on top of the overlay paper layer.

It is also an object of the present invention to provide a decorative laminate lay-up wherein the overlay paper layer is a melamine impregnated paper layer.

It is also an object of the present invention to provide a decorative laminate manufactured in accordance with the method comprising assembling a decorative laminate sheet assembly composed of resin impregnated paper layers and positioning a texture imparting member on a top surface of the decorative laminate sheet assembly, wherein the texture imparting member includes a textured surface exhibiting superhydrophobicity, self-cleaning and low surface energy. The method also includes applying heat and pressure to the decorative laminate sheet assembly and the texture imparting member sufficient to bond layers of the decorative laminate sheet assembly for the formation of a decorative laminate and removing the texture imparting member from the top surface of the decorative laminate revealing a textured surface exhibiting superhydrophobicity, self-cleaning and low surface energy.

It is another object of the present invention to provide a decorative laminate wherein the texture imparting member is textured release sheet that is cast.

It is a further object of the present invention to provide a decorative laminate wherein the texture imparting member is a textured press plate.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 5A and 5B are respectively a scanning electron micrograph image illustrating a plurality of microasperities and an enlarged view of one of the plurality of microasperities shown in FIG. 5A.

FIGS. 6A and 6B are respectively a scanning electron micrograph image illustrating a hierarchical structure comprising microasperities and nanoasperities (0.12 $\mu g/mm^2$ mass of n-hexatriacontane) disposed thereon and an enlarged view of one of the hierarchical structures of FIG. 6A.

FIGS. 7A and 7B are respectively a scanning electron micrograph image illustrating a hierarchical structure comprising microasperities and nanoasperities (0.2 $\mu g/mm^2$ mass of n-hexatriacontane) disposed thereon and an enlarged view of one of the hierarchical structures of FIG. 7A.

FIGS. 8A and 8B are respectively a scanning electron micrograph image illustrating a hierarchical structure comprising microasperities and nanoasperities (0.4 $\mu g/mm^2$ mass of n-hexatriacontane) disposed thereon and an enlarged view of one of the hierarchical structures of FIG. 8A.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
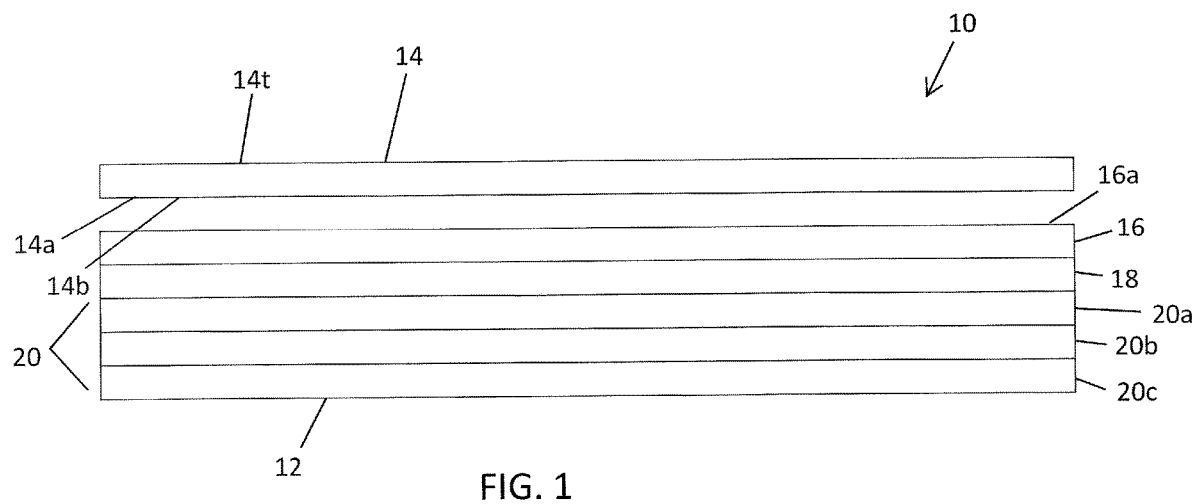
FIG. 1 is a schematic of a decorative laminate lay-up in accordance with the present invention.
Figure 2:
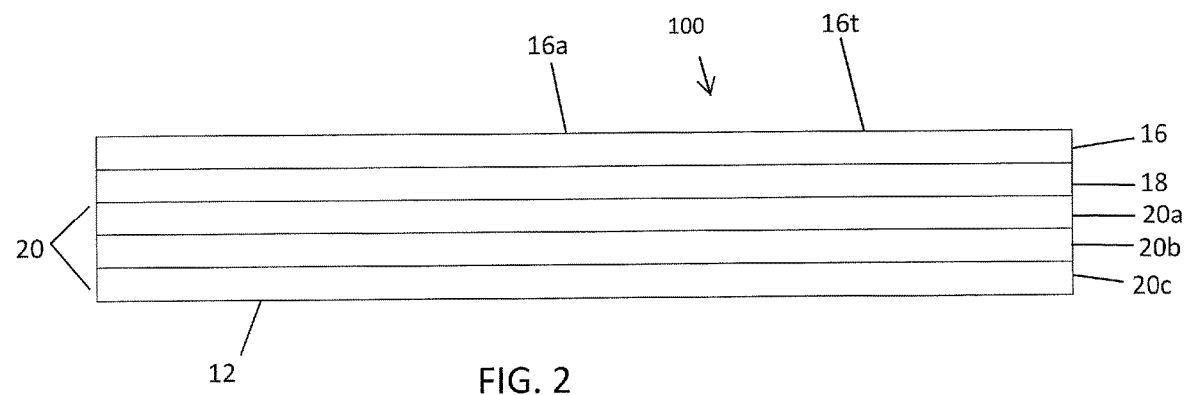
FIG. 2 is a schematic of a decorative laminate produced in accordance with the present invention.

With reference to FIG. 1, a decorative laminate lay-up 10 including a decorative laminate sheet assembly 12 (composed of an exterior overlay paper layer 16, a decorative layer 18, and a core layer 20 as discussed below in greater detail) and a texture imparting member in the form of a textured release sheet 14 (including a top side 14t and a bottom side 14b) is disclosed. The decorative laminate lay-up 10 is used in the manufacture of a decorative laminate 100 (see FIG. 2) in accordance with the present invention. The textured release sheet 14 provides a textured surface 14a (formed on the bottom side 14b thereof) to decorative laminates 100 and also functions as a release sheet between decorative laminate sheet assemblies 12. With this in mind, the present textured release sheets 14 may be used in gang processing of decorative laminates 100 or the present textured release sheets 14 may be used in the manufacture of single laminate sheets to simply impart a desired texture and gloss.

The decorative laminate lay-up 10 is assembled by first stacking a decorative laminate sheet assembly 12 having a top layer (which, as explained below, is preferably an overlay paper sheet 16). That is, the sheets used in the production of the decorative laminate 100 are stacked in preparation for the heating and pressure steps used to consolidate the decorative laminate. A textured release sheet 14 is prepared, preferably by cast manufacturing procedures as discussed below. In accordance with a preferred embodiment the textured release sheet 14 is an acrylic coated paper manufactured by Sappi Inc.

Although other manufacturing techniques may be employed without departing from the spirit of the present invention, the process for producing surface effects in a release coating as disclosed in U.S. Pat. No. 4,289,821, entitled "SURFACE REPLICATION ON A COATED SUBSTRATE," and U.S. Pat. No. 4,322,450 entitled "SURFACE REPLICATION ON A COATED SUBSTRATE," both of which are incorporated herein by reference, may be employed in the manufacture of textured release sheets for use in accordance with the present invention. Briefly, these patents teach techniques for producing surface effects in a release coating on a release sheet. In accordance with the disclosed methodology a coating of an electron beam radiation curable material is applied to one surface of a web substrate, the coated side of the substrate is pressed against a replicative surface having the desired surface effect to cause the coating to conform to the replicative surface, the coating is irradiated with electron beam radiation to cure the coating, and the substrate is stripped from the replicative surface with the cured coating adhered to the substrate (ultimately resulting in the textured release sheet after it is cut and ready for use in the manufactured of decorative laminate in the manner appreciated by those skilled in the art). The replicative surface is preferably a metal roll with either a pattern engraved in its surface or a highly polished smooth surface. This technique enables replication of the very fine patterns contemplated in accordance with the present invention.

The processes of the '821 patent and the '450 patent are preferably implemented using the coating compositions disclosed in U.S. Pat. No. 4,311,766, entitled "RELEASE COATING," and U.S. Pat. No. 4,327,121, entitled "RELEASE COATING," both of which are incorporated herein by reference. The '766 patent and '121 patent disclose electron beam curable coating compositions comprising acrylic functional materials and silicone release agents which may be used in the manufacture of release sheets.

The textured release sheet 14 is positioned on the top surface 16a (in the case of the present decorative laminate sheet assembly 12 it is the upper surface of the overlay sheet 16) of the decorative laminate sheet assembly 12 to form the decorative laminate lay-up 10. The textured release sheet 14 is positioned on the overlay sheet 16 with the bottom side 14b (that is, the textured surface 14a) of the release sheet 14 facing the top surface 16a of the overlay sheet 16. Heat and pressure are applied to the decorative laminate sheet assembly 12 and the textured release sheet 14 sufficient to bond the layers of the decorative laminate sheet assembly 12, and releasably bond the textured release sheet 14 to the top surface 16a of the decorative laminate sheet assembly 12. Finally, the textured release sheet 14 is removed from the top surface 16a of the formed decorative laminate 100 to reveal a decorative laminate 100 exhibiting desired texture characteristics.

In accordance with the present invention, the release sheet 14 is formed with a textured surface 14a on the bottom side 14b thereof (the texture of which is ultimately applied to the top surface 16a of the decorative laminate 100) exhibiting superhydrophobicity, self-cleaning and low surface energy as disclosed in U.S. Pat. No. 8,137,751, entitled "HIERARCHICAL STRUCTURES FOR SUPERHYDROPHOBIC SURFACE AND METHODS OF MAKING," which is incorporated herein by reference. The following disclosure presents various parameter ranges that may be employed in accordance with the present invention and it is appreciated the ranges may vary slightly so long as the functionalities underlying the present invention are maintained. In particular, the textured surface 14a of the release sheet 14 (and ultimately the top surface 16a of the decorative laminate 100) is formed with hierarchical structures comprising microstructures and nanostructures. In accordance with a preferred embodiment, the superhydrophobicity, self-cleaning and low adhesion structure is modeled from structures found in nature, such as Nelumbo nucifera (lotus). A lotus leaf is superhydrophobic due to the intrinsic hierarchical structure. This structure is built by convex cell papillae and randomly oriented hydrophobic wax tubules, which have high contact angles with water and show strong self-cleaning properties.

Hierarchical structures as used in accordance with the present invention provide non-adhesive and water repellent properties in decorative laminate similar to a lotus leaf. As used herein, superhydrophobicity is considered to refer to the ability of a surface to have a very high water contact angle, and low contact angle hysteresis. As those skilled in the art appreciate, the water contact angle is the angle, conventionally measured through the liquid, where the water interface meets a solid surface. It quantifies the wettability of a solid surface by a liquid via the Young equation. Hysteresis is the difference between the advancing contact angle and the receding contact angle. To achieve high static contact angle along with low contact angle hysteresis, superhydrophobic surfaces should form a composite interface with air pockets.

The textured surface 14a of the release sheet 14, and ultimately the top surface 16a of the decorative laminate 16 to which the textured surface 14a is applied as texture 16t resulting in a textured top surface 16a of the resulting decorative laminate 100, exhibits the ability of a water drop to bounce off the surface thereof. This property is a function of the fact that the energy barriers separating between the "sticky" and "non-sticky" states needed for bouncing drops have the same origin as those needed for high contact angle and low contact angle hysteresis. When the textured surface 14a (that is, the texture) of the release sheet 14 is applied to the decorative laminate 100 as discussed below in greater detail, the top surface 16a of the decorative laminate 100 is imparted with a texture 16t (that is, the decorative laminate 100 is provided with a textured surface) that is the same as the texture of the textured surface 14a of the release sheet allowing the decorative laminate 100 to achieve high static contact angle along with low contact angle hysteresis.

The hierarchical surface structure of the textured surface 14a of the release sheet 14 and ultimately the top surface 16a of the decorative laminate 16 to which the textured surface 14a is applied comprises a microstructure composed of a plurality of microasperities disposed in a spaced geometric pattern thereon, wherein the fraction of the surface area of the substrate covered by the microasperities is from between 0.1 to 1.0. The hierarchical surface structure further comprises a nanostructure comprising a plurality of nanoasperities disposed on at least one surface of the microstructure.

More particularly, the hierarchical surface 201 comprises a microstructure 210 including a plurality of microasperities 212 disposed in a geometric pattern on at least one surface of a substrate 200 (for example the underlying base structure of the release sheet 14 in accordance with the present invention), and a nanostructure 220 disposed on at least one surface of the microstructure 210. The microasperities 212 are high enough so that a droplet does not touch the valleys between adjacent microasperities 212. In the embodiment shown in FIG. 3, the microasperities 212 have a height H of between 1 to 100 μm and a diameter D of between 1 to 50 wherein the fraction of the surface area of the substrate 200 covered by the microasperities 212 ranges from between 0.1 to 1. In other embodiments, the fraction of the surface area of the substrate covered by the microasperities is from between 0.5 to 1, or from 0.8 to 1.0.

Figure 3:
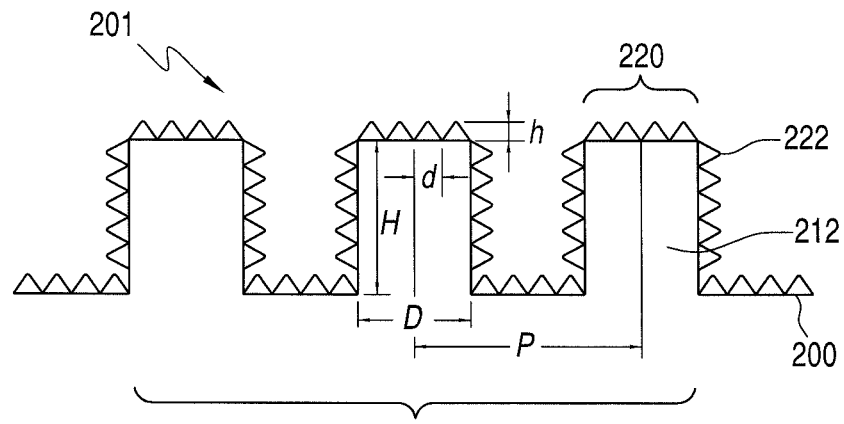
FIG. 3 is a schematic view illustrating a hierarchical structure comprising microasperities in the shape of circular pillars with diameter D, height H, and pitch P, and pyramidal shaped nanoasperities of height h and diameter d with rounded tops in accordance with the present invention.
Figure 4A:
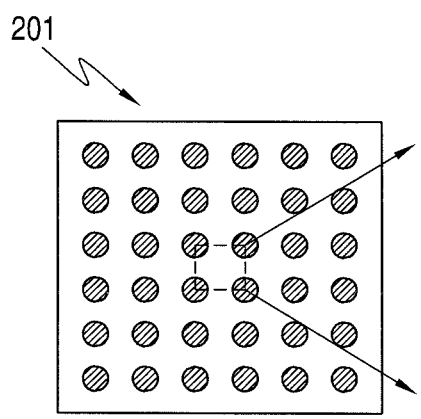
FIGS. 4A and 4B are schematic views illustrating a geometrical arrangement of microasperities on a substrate, specifically highlighting the pitch P between adjacent microasperities.
Figure 4B:
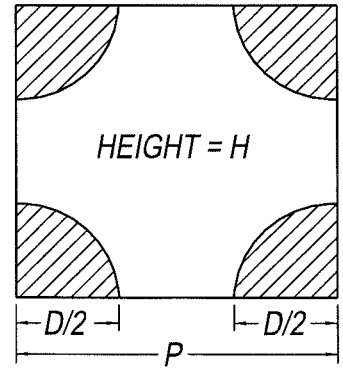

Further, and as shown in FIGS. 3, 4A, and 4B, the pitch P between adjacent microasperities ranges from between 1 and 500 μm. The scanning electron micrograph image of FIG. 5A, which only illustrates microstructures, provides an example of a geometric arrangement of microasperities 212 on a substrate 200. Moreover, although the microasperities illustrated in FIGS. 6B through 8B are cylindrical with a rounded top, numerous other shapes of microasperities are contemplated herein. For additional embodiments of asperity shapes, attention is directed to U.S. Patent Application Publication No. 2006/0078724 entitled "HYDROPHOBIC SURFACE WITH GEOMETRIC ROUGHNESS PATTERN" which is incorporated by reference herein in its entirety.

Referring again to FIG. 3, the nanostructure 220 of the hierarchical surface 201 comprises a plurality of nanoasperities 222 disposed on at least one surface of the microstructure 210. As shown, the plurality of nanoasperities 222 are disposed on the microasperities 212, on the substrate 200 in the spacing between adjacent microasperities 212, or combinations thereof. Furthermore, the nanoasperities 222 have a height h of between 1 to 100 nm and a diameter d of between 1 to 300 nm. In accordance with alternate embodiments, the plurality of nanoasperities 222 are arranged randomly as shown in FIGS. 6B, 7B, and 8B, while the schematic illustration of FIG. 3 shows the nanoasperities 222 arranged in a geometric pattern. As with the microasperities 212, the nanoasperities 222 have various asperity shapes. For example, and with reference to the embodiment of FIG. 3, the nanoasperities 212 may include pyramidal pillars with rounded tops.

It is appreciated that various arrangements may be employed for the hierarchical structures and the nanoasperities and microasperities thereon. As described above and as shown with reference to FIGS. 6A-8B, the microasperities 212 include circular pillars. The circular pillar microstructure achieve a composite interface defined by the following relation ($\sqrt{2}$P−D)2/R<H. In accordance with the relation and as illustrated in FIG. 1, a droplet with a radius R on the order of 1 mm or larger, a microasperity height H on the order of 30 μm, a microasperity diameter D on the order of 15 μm, a pitch P between microasperities on the order of 130 μm are considered to be optimum.

Referring again to FIG. 3, the nanoasperities 222 pin the liquid-air interface and thus prevent liquid from filling the valleys between microasperities 212. The nanoasperities 222 also support nanodroplets, which may condense in the valleys between microasperities 212, especially larger microasperities 212. It is therefore appreciated that nanoasperities 222 preferably should have a small pitch to handle nanodroplets having a size less than 100 nm to 1 nm radius. The nanoasperities 222 are also preferably high enough so that a droplet does not touch the valleys between adjacent nanoasperities 222. For example, the nanoasperities 222 comprise a height h of 5 to 50 nm, or 10 to 20 nm. Additionally, the nanoasperities 222 comprise a diameter d of up to 100 nm, or between 50 to 100 nm.

As the hierarchical surface structure of the textured surface 14a of the release sheet 14 is ultimately imparted to the top surface 16a of the decorative laminate 100 formed using the textured release sheet 14, the resulting decorative laminate 100 is provided with a top surface 16a having texture 16t that is the same as that of the textured surface and will exhibit desired superhydrophobicity. It is appreciated the decorative laminate may be any of the many resin based decorative laminates known to those of ordinary skill in the art. In accordance with one embodiment of the present invention, and as discussed above, the decorative laminate includes an overlay layer sheet, or top layer, a decorative sheet and a core.

More particularly, and as will be described in greater detail below, the decorative laminate 100 includes an exterior overlay paper layer 16, a decorative layer 18, and a core layer 20. While a specific layering pattern is disclosed in accordance with a preferred embodiment of the present invention, the layering pattern may be varied, somewhat, without departing from the spirit of the present invention.

The overlay paper layer 16 is preferably a melamine impregnated paper layer. The decorative layer 18 is a conventional pattern sheet positioned directly beneath the overlay paper layer 16. When the decorative laminate 100 is fully heated and pressed, as will be discussed below in greater detail, the overlay paper layer 16 becomes translucent, fully exposing the decorative layer 18. In addition, it is the top surface 16a of the overlayer paper layer 16 which takes on the texture 16t imparted by the release sheet 14. With this in mind, the decorative layer 18 is substantially responsible for the aesthetic appearance of the finished decorative laminate 100.

Decorative layers 18 are chosen from a wide array of sheets. For example, the decorative layer 18 may be a solid color (for example, white) or include an aesthetically appealing pattern. As discussed above, the decorative layer 18 provides the decorative laminate 100 with an attractive appearance. The overlay paper layer 16 and the decorative layer 18 also dictate the surface characteristics of the final decorative laminate 100. For example, the composition of the overlay paper layer 16 and decorative layer 18 help to dictate the decorative laminate's resistance to chemical agents, heat, light, shock and abrasion.

Decorative sheets 18 are commonly manufactured from high quality 80-202 grams/m² ream weight, pigment filled, alpha cellulose paper impregnated with a water alcohol or water solution of melamine-formaldehyde resin. The resin impregnated decorative sheets 18 are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The core layer 20 is preferably a plurality of phenolic resin impregnated sheets 20a, 20b, 20c, although other materials may be used without departing from the spirit of the present invention. For example, the core layer 20 includes sheets of 120-323 grams per square meter dry phenolic resin impregnated Kraft paper. The Kraft paper is impregnated throughout and bonded with a substantially cured phenolic resin which has been converted to a thermoset state during the initial laminating step.

In accordance with the present invention, the decorative laminate 100 of the present invention is formed in much the same manner as conventional decorative laminates. The layers are first stacked and placed between steel plates with the release sheet 14 covering the overlay paper layer 16. The decorative laminate stack 10 is then subjected to temperatures in the range of 121° C.-160° C. and pressure of about 56.24 kg/cm2 to 112.48 kg/cm2 for a time sufficient to consolidate the laminate and cure the resins (generally about 25 minutes to an hour).

The pressure and heat force the resin in the paper sheets to flow, cure and consolidate the sheets into a unitary laminated mass referred to in the art as a decorative high pressure decorative laminate 100 having the hydrophobic textured surface 16t as described above which is imparted by the textured surface 14a of the release sheet 14. Generally, more than one decorative laminate is formed at one time. Multiple decorative laminates are formed by inserting a plurality of sheets in a stack. The textured release sheets 14 are positioned between the assembled sheets to separate the various decorative laminates stacked together and to impart the desired texture thereto. The textured surface 14a of the release sheet 14 is oriented against the top surface 16a (in this case the upper surface of the overlay paper layer 16) of the decorative laminate sheet assembly 12, be it the decorative sheet 18 or overlay paper layer 16, with the smooth top side (or back surface) 14t of the textured release sheet 14 positioned against the core stock of an adjacent lay-up or steel plate. Upon pressing between suitable laminate press plates, the textured release sheet 14 imparts the hydrophobic texture 16t described above to the top surface 16a of the first lay-up (in this case the overlay paper layer 16 creating the hydrophobic texture 16t discussed above), and serves to allow release between the first lay-up and the adjacent lay-up. A platen press assembly, as is well known in the lamination art, provides the necessary heat and/or pressure during lamination. After consolidation, the release sheets allow the individual decorative laminates to be separated.

Figure 9:
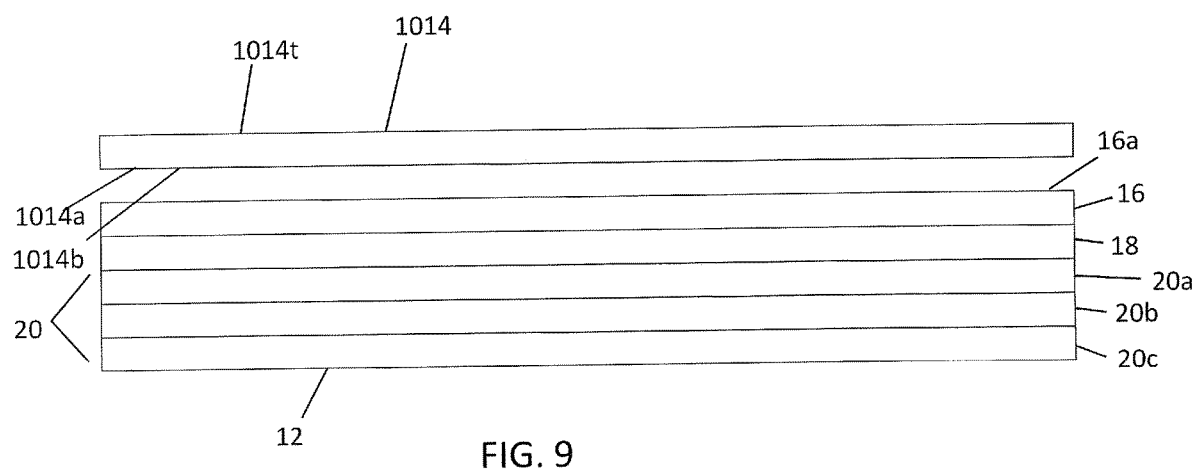
FIG. 9 is a schematic of a laminate sheet assembly and press plate in accordance with an alternate embodiment of the present invention.
Figure 10:
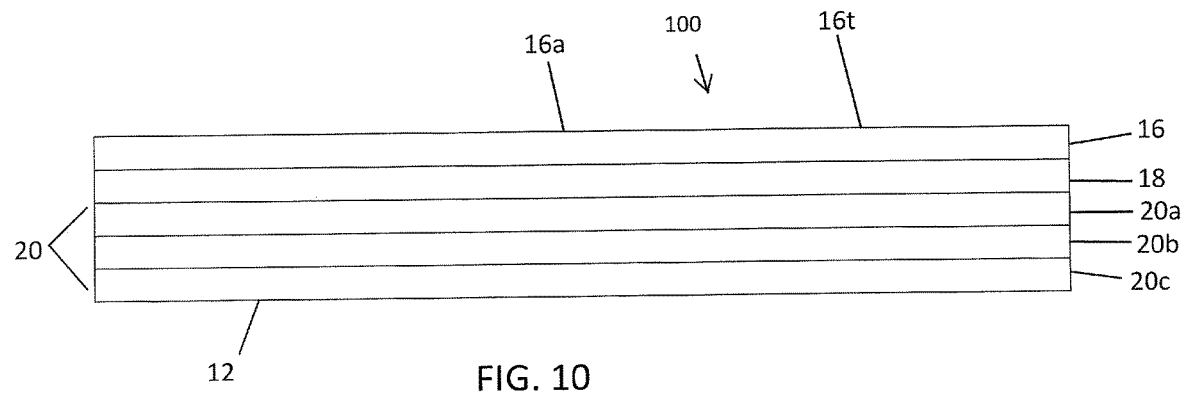
FIG. 10 is a schematic of a decorative laminate produced in accordance with the embodiment shown with reference to FIG. 9.

Referring to FIGS. 9 and 10, the decorative laminate including a desired textured surface in accordance with the present invention may also be fabricated in a single batch process with the textured release sheet being replaced by a texture imparting member in the form of a textured press plate 1014. In accordance with such an embodiment, a decorative laminate sheet assembly 12 composed of an exterior overlay paper layer 16, a decorative layer 18, and a core layer 20 (as discussed above) is formed. The decorative laminate sheet assembly 12 is consolidated using a textured press plate 1014 having a top side 1014t and a bottom side 1014b with a textured surface 1014a. As with the textured release sheet of the prior embodiment, the textured press plate 1014 provides a textured surface to a resulting decorative laminate, wherein the textured surface is the same as that discussed above with reference to FIGS. 1-8 and results in a decorative laminate that exhibiting superhydrophobicity, self-cleaning and low surface energy as disclosed in U.S. Pat. No. 8,137,751, entitled "HIERARCHICAL STRUCTURES FOR SUPERHYDROPHOBIC SURFACE AND METHODS OF MAKING."

The decorative laminate sheet assembly 12 is stacked in preparation for the heating and pressure steps used to consolidate the laminate. The textured press plate 1014 is also prepared. In accordance with a preferred embodiment the textured press plate is a stainless steel plate. During fabrication, the textured press plate 1014 is positioned on the top surface 16a (in the case of the present laminate sheet assembly it is the upper surface of the overlay sheet 16) of the laminate sheet assembly 12, and heat and pressure are applied to the laminate sheet assembly 12 sufficient to bond the layers of the decorative laminate sheet assembly 12. When the textured press plate 1014 is removed from the top layer 16a of the formed decorative laminate 100, a decorative laminate exhibiting desired texture characteristics is revealed.

The textured press plate 1014 is formed with a textured surface 1014a exhibiting anti-reflective, hydrophobic and oleophobic characteristics leading to a fingerprint proof surface, that is, a surface not showing fingerprints and remaining clean and clear dispute regular use. The texture applied to the textured press plate 1014 (and ultimately applied to the top surface 16a of the resulting decorative laminate 100) increases the water contact angles for water placed upon the textured surface, suggesting that the texture has become more hydrophobic. When the textured surface 1014a of the press plate 1014 is applied to the decorative laminate 100, the texture 16t of the top surface 16a of the laminate 100 takes on the textured surface 1014a of the textured press plate making the laminate 100 less susceptible to the formation of annoying and undesirable fingerprints thereon.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A decorative laminate lay-up used in the manufacture of decorative laminates, comprising:
a decorative laminate sheet assembly composed of resin impregnated paper layers, the decorative laminate sheet assembly includes an overlay paper layer composed of a melamine impregnated paper layer, a decorative layer composed of alpha cellulose paper impregnated with a water alcohol or water solution of melamine-formaldehyde resin, and a core layer composed of a plurality of phenolic resin impregnated sheets; and
a textured release sheet including a substrate and a textured acrylic release coating, the textured acrylic release coating defining an electron beam cured textured surface, wherein the textured acrylic release coating is an electron beam radiation curable material composed of acrylic functional materials and silicone release agents applied to one surface of the substrate and subsequently pressed against a replicative surface exhibiting superhydrophobicity and self-cleaning characteristics to cause the electron beam radiation curable material to conform to the replicative surface, the electron beam radiation curable material is then irradiated with electron beam radiation to cure the electron beam radiation curable material and form the textured acrylic release coating, the textured release sheet being positioned on the overlay paper layer that defines a top surface of the decorative laminate sheet assembly, the textured release sheet providing a textured surface to decorative laminates resulting from processing of the decorative laminate sheet assembly, wherein the textured release sheet includes the electron beam cured textured surface exhibiting superhydrophobicity and self-cleaning;
wherein the decorative laminate sheet assembly and the textured release sheet are subjected to heat and pressure for a time sufficient to consolidate the decorative laminate sheet assembly and cure resins;
wherein the textured surface of the textured release sheet includes hierarchical structures comprising microstructures and nanostructures and wherein the nanostructures comprise a plurality of nanoasperities disposed on at least one surface of the microstructures.

2. The decorative laminate lay-up according to claim 1, wherein the microstructures are composed of a plurality of microasperities disposed in a spaced geometric pattern.

3. A decorative laminate manufactured in accordance with the method comprising:
assembling a decorative laminate sheet assembly composed of resin impregnated paper layers, the decorative laminate sheet assembly includes an overlay paper layer composed of a melamine impregnated paper layer, a decorative layer composed of alpha cellulose paper impregnated with a water alcohol or water solution of melamine-formaldehyde resin, and a core layer composed of a plurality of phenolic resin impregnated sheets;

positioning a texture imparting member on a top surface of the decorative laminate sheet assembly, the texture imparting member including a substrate and a textured acrylic release coating, the textured acrylic release coating defining an electron beam cured textured surface, wherein the textured acrylic release coating is an electron beam radiation curable material composed of acrylic functional materials and silicone release agents applied to one surface of the substrate and subsequently pressed against a replicative surface exhibiting superhydrophobicity and self-cleaning characteristics to cause the electron beam radiation curable material to conform to the replicative surface, the electron beam radiation curable material is then irradiated with electron beam radiation to cure the electron beam radiation curable material and form the textured acrylic release coating, the textured release sheet providing the textured surface to decorative laminates resulting from processing of the decorative laminate sheet assembly, wherein the textured surface exhibits superhydrophobicity and self-cleaning;

applying heat and pressure to the decorative laminate sheet assembly and the texture imparting member sufficient to bond layers of the decorative laminate sheet assembly for the formation of a decorative laminate;

removing the texture imparting member from the top surface of the decorative laminate revealing a textured surface exhibiting superhydrophobicity and self-cleaning;

wherein the textured surface of the textured release sheet includes hierarchical structures comprising microstructures and nanostructures and wherein the of the microstructures.

4. The decorative laminate according to claim 3, wherein the microstructures are composed of a plurality of microasperities disposed in a spaced geometric pattern.

\* \* \* \* \*